Aug. 18, 1964    TAKAJI KURODA    3,145,350
MICROWAVE MODULATOR MEASURING SYSTEM
Filed July 15, 1960    2 Sheets-Sheet 1

Inventor
T. KURODA

By [signature]
AGENT

Inventor
T. KURODA
By E.H. Suydam
AGENT

United States Patent Office 3,145,350
Patented Aug. 18, 1964

3,145,350
MICROWAVE MODULATOR MEASURING SYSTEM
Takaji Kuroda, Tokyo, Japan, assignor to Nippon Electric Company Limited, Tokyo, Japan, a corporation of Japan
Filed July 15, 1960, Ser. No. 43,092
Claims priority, application Japan July 23, 1959
5 Claims. (Cl. 332—20)

In a super-multiplex communication system or a television repeating system employing microwave frequency modulation techniques non-linearities in the modulation and phase characteristics of a modulator, or of a transmission system comprising a modulator, are important problems. Regarding measuring systems for these characteristics, various proposals have been made for their improvement. One conventional system, however, has such inconveniences as to require a counter-receiver provided with a microwave vacuum tube, a complicated measuring instrument, in order to obtain the characteristics of the transmission device.

According to the present invention these inconveniences are eliminated and the invention is adapted for frequency discriminating the modulated microwave output directly, not necessitating a receiving device in performing the measurement of the modulation characteristics, phase characteristic, etc. of a modulator, or of a microwave transmission system comprising a modulator, thus greatly simplifying the measuring device.

Figure 1:
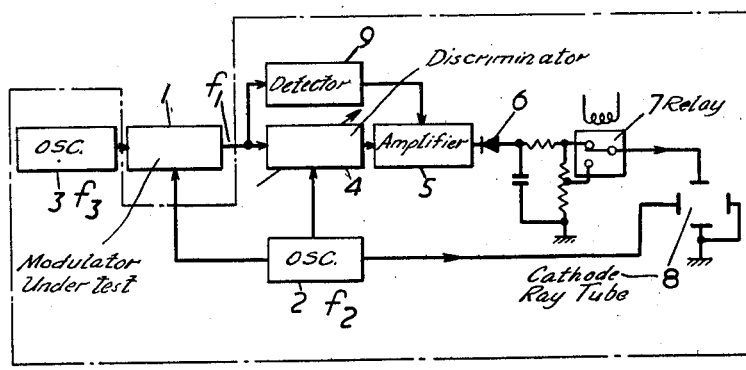
Figure 2:
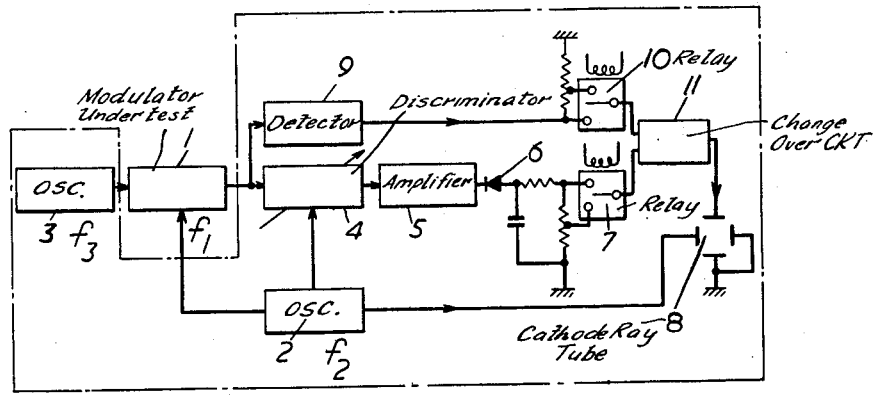
Figure 3:
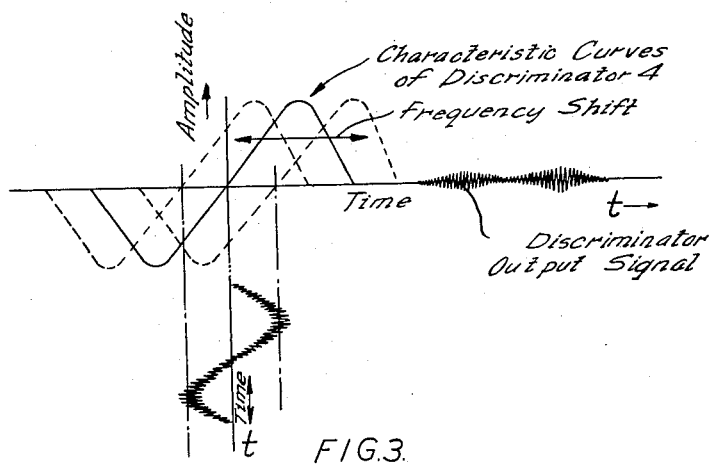
Figure 4:
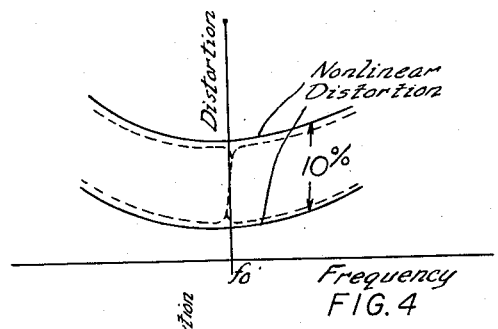
Figure 5:
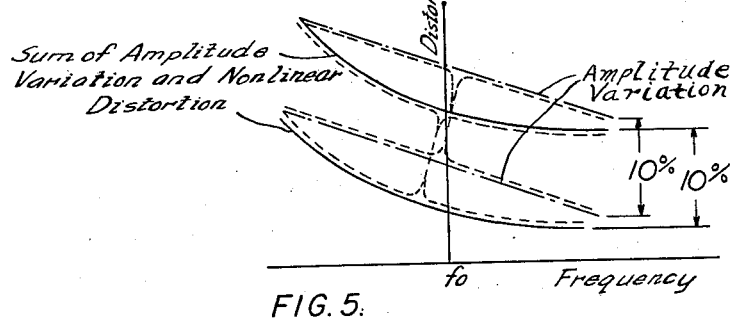

The above-mentioned and other features and objects of this invention and the manner of attaining them will become more apparent and the invention itself will be best understood by reference to the following description of an embodiment of the invention taken in conjunction with the accompanying drawings in which:

FIGS. 1 and 2 show schematic block diagrams for embodiments of this invention; and
FIGS. 3, 4 and 5 show diagrams illustrating the operations of the invention.

The operation will now be described in detail. FIG. 1 is a schematic block diagram for an embodiment when the invention is used for the measurement of the modulation characteristic of the modulator. 1 is the microwave modulation device, having an output frequency $f1$, under test, or it may be a transmission system comprising said modulation device. The chained-line portion indicates a measuring device employing a measuring system according to this invention. In the embodiment shown in FIG. 1 of the drawing; 2 is an oscillator having a low frequency $f2$, for instance 50 cycles; 3, an oscillator of a comparatively high frequency $f3$, for instance 200 kc.; 4, a microwave frequency discriminator which is synchronized with the low frequency (50 cycles) generated by the oscillator 2, its central frequency being varied as much as the frequency deviation of the modulator output; 5, an amplifier for $f3$ (200 kc.); 6, a rectifier for $f3$ (200 kc.); 7, a relay for switching-over the output from the rectifier 6 at a certain ratio; 8, a cathode ray tube for indication; 9, a circuit for detecting the amplitude modulation component of the output from the modulating device 1.

Generally, in measuring the modulation characteristic of a microwave modulation device, it has been the common practice to resort to the so called differential characteristic, which consists in modulating the modulator at say 200 kc. with a low modulation degree and further modulating at a low frequency, say 50 cycles, to give a regulated frequency shift. From the modulated output wave there is derived only the 200 kc. component, thereby enabling the measurement of the variation in the 200 kc. component within a regulated frequency deviation. According to this conventional system, in order to prevent the differential characteristic of the frequency discriminator of the receiver from being a measurement error, the frequency of the local oscillator of the receiver is varied by synchronizing it with the 50 cycle frequency applied to the modulator. Thus the received wave is so frequency controlled that the resulting intermediate frequency wave becomes, except for the variations resulting from the modulation, a wave at a fixed frequency of 200 kc. and, by operating the frequency discriminator at a fixed intermediate frequency at one point, the variable portion may be measured.

According to the present invention, the frequency discriminator 4 in FIG. 1 is synchronized with the 50 cycle wave applied to the modulator, thereby varying the central point of the discriminator characteristic by the frequency deviation portion of the modulator. Therefore, as shown in FIG. 3, the frequency discriminator will always perform its detecting operation only at one point of the frequency discriminator in spite of the variation in frequency of the modulated wave. Accordingly, it enables one to select the 200 kc. portion from the modulated wave, irrespective of the characteristic of the frequency discriminator, thus allowing the faithful derivation of the variation of the 200 kc. component generated by the modulation device, or by the transmission system comprising the modulation device. That is, according to the present invention as shown in FIG. 1, it is possible to faithfully select the variation in the 200 kc. component generated by the modulation device, or the transmission system comprising a modulation device, irrespective of the characteristic of the discriminator, by directly frequency discriminating the modulated received wave—not necessitating the temporary transition of the received wave into an intermediate frequency wave. The 200 kc. output is rectified by rectifier 6, as is well known generally, and is applied to the ordinate deflection electrodes of the cathode-ray tube after being changed-over by relay 7 at a certain ratio determined by the voltage divider tap positions. The wave form as shown in FIG. 4 will be obtained if the time axis trace is derived from the 50 cycle waves of oscillator 2. If the ratio of change-over is taken at 10%, for instance, the variation component of 200 kc. can be read out, assuming the space between the two lines in FIG. 4 as representing a 10% scale. In the present system, however, there is no amplitude limiter, and so, when an amplitude modulation component is contained in the modulation output, the variation in the 200 kc. waves due to amplitude modulation and the variation in the 200 kc. wave due to non-linearity of the frequency modulator will be superposed. This defect can be remedied by applying the amplitude modulation output detected by the dector circuit 9 to the 200 kc. amplifier 5, thereby eliminating the amplitude modulation component.

Alternately, in order to eliminate the amplitude modulation component, the output of the detected amplitude modulation may be changed-over by relay 10 changing the relay contact to different tap positions on the voltage divider while the output of rectifier 6 is passed through relay 7. The outputs from the two relays are then connected to a two-display change-over circuit 11 as shown in FIG. 2, thus enabling a measurement to be obtained from the wave forms on the cathode ray tube as shown in FIG. 5. That is, assuming that the chained line (dot and dash) portion in FIG. 5 represents the amplitude variation in the modulated wave, the variation in the 200 kc. component due to frequency modulation can be read out by taking, as the reference line, the chained line representing the amplitude variation.

The following methods are well known for varying the center point of a microwave frequency discriminator: by vibrating the side walls of the cavity resonator of a discriminator with a synchronizing low frequency wave; by varying the external magnetic field by placing a ferrite material within the cavity; by utilizing the variation of a semi-conductor impedance. Although the foregoing description has only dealt with the measurement of the differential characteristic, it will be clear that circuitry can be developed to also measure the phase characteristic, the delay characteristic, etc., by supplementing the above-mentioned system with other well known methods. Furthermore, as to the low frequency oscillator which imparts a regulated frequency deviation, a line synchronizing system which uses the frequency of an A.-C. input electric source will serve with the same effect. Therefore, the effect of this invention is of great practical importance.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A measuring system for determining the modulation characteristics of a frequency modulation device comprising:
   (a) a first source of oscillations connected to said device for modulating its output over a small portion of its normal operating frequency range,
   (b) a second source of oscillations, having a frequency lower than that of said first source, connected to said modulation device for further modulating its output over its normal operating frequency range,
   (c) a variable center-frequency discriminator connected to the output of said device for deriving the variations in the first frequency as modified by the said device,
   (d) means for deviating the center-frequency of said discriminator in synchronism with the lower frequency oscillations,
   (e) a detector connected to the output of said modulation device for detecting amplitude variations in the modulated output,
   (f) a cathode ray display tube coupled to said discriminator and said detector,
   (g) means for obtaining the time axis trace of the display tube from said lower frequency oscillations,
   (h) and means including said detector for eliminating the amplitude modulation component of said first frequency oscillations as modified by said modulator device.

2. A measuring system for determining the modulation characteristics of a frequency modulation device comprising:
   (a) a first source of oscillations connected to said device for modulating its output over a small portion of its normal operating frequency range,
   (b) a second source of oscillations, having a frequency lower than that of said first source connected to said modulation device for further modulating its output over its normal operating frequency range,
   (c) a variable center-frequency discriminator connected to the output of said device for deriving the variations in the first frequency as modified by the said device,
   (d) means for deviating the center-frequency of said discriminator in synchronism with the lower frequency oscillations,
   (e) a detector connected to the output of said modulation device for detecting amplitude variations in the modulated output,
   (f) means connected to said discriminator and said detector for combining said detected amplitude variations and said variations in said first frequency as modified by said modulator to eliminate the amplitude components in the latter.
   (g) means for rectifying the combined output variations,
   (h) a cathode ray display tube,
   (i) means for obtaining the time axis trace of the display tube from said lower frequency oscillations,
   (j) and means for applying said combined rectified output variations to said display tube.

3. A measuring system as claimed in claim 2 in which said means for applying said combined rectified output variations to said display tube comprises a voltage divider and means for alternately tapping one of two points on said divider.

4. A measuring system for determining the modulator characteristics of a frequency modulation device comprising:
   (a) a first source of oscillations connected to said device for modulating its output over a small portion of its normal operating frequency range,
   (b) a second source of oscillations, having a frequency lower than that of said first source, connected to said modulation device for further modulating its output over its normal operating frequency range,
   (c) a variable center-frequency discriminator connected to the output of said device for deriving the variations in the first frequency as modified by the said device,
   (d) means for deviating the center-frequency of said discriminator in synchronism with the lower frequency oscillations,
   (e) a detector connected to the output of said modulation device for detecting amplitude variations in the modulated output,
   (f) means coupled to said discriminator for rectifying said derived variations in said first frequency as modified by said modulator,
   (g) a cathode ray display tube,
   (h) means for obtaining the time axis trace of the display tube from said lower frequency oscillations,
   (i) and means for alternately applying the detected amplitude variations and the rectified derived variations to said display tube.

5. A measuring system as claimed in claim 4 in which said means for applying the variations to said display tube comprises means for so adjusting the voltage values representing the detected amplitude variations and the rectified derived variations, respectively, that the trace of the amplitude variations provides a reference line for an indication of the magnitude of the modulation components.

References Cited in the file of this patent
UNITED STATES PATENTS

| | | |
|---|---|---|
| 2,646,461 | Grace et al. | July 21, 1953 |
| 2,678,427 | Smith | May 11, 1954 |